US012112426B2

(12) United States Patent
Hellge et al.

(10) Patent No.: US 12,112,426 B2
(45) Date of Patent: Oct. 8, 2024

(54) AUGMENTING A VIEW OF A REAL-WORLD ENVIRONMENT WITH A VIEW OF A VOLUMETRIC VIDEO OBJECT

(71) Applicant: FRAUNHOFER-GESELLSCHAFT ZUR FÖRDERUNG DER ANGEWANDTEN FORSCHUNG E.V., Munich (DE)

(72) Inventors: Cornelius Hellge, Berlin (DE); Thomas Schierl, Berlin (DE); Peter Eisert, Berlin (DE); Anna Hilsmann, Berlin (DE); Robert Skupin, Berlin (DE); Yago Sanchez, Berlin (DE); Jangwoo Son, Berlin (DE); Gurdeep Singh Bhullar, Berlin (DE); Serhan Gül, Berlin (DE); Dimitri Podborski, Berlin (DE)

(73) Assignee: Fraunhofer-Gessellschaft zur Förderung der angewandten Forschung EV, Munich (DE)

( * ) Notice: Subject to any disclaimer, the term of this patent is extended or adjusted under 35 U.S.C. 154(b) by 171 days.

(21) Appl. No.: 17/784,883

(22) PCT Filed: Dec. 15, 2020

(86) PCT No.: PCT/EP2020/086121
§ 371 (c)(1),
(2) Date: Jun. 13, 2022

(87) PCT Pub. No.: WO2021/122529
PCT Pub. Date: Jun. 24, 2021

(65) Prior Publication Data
US 2023/0008125 A1 Jan. 12, 2023

(30) Foreign Application Priority Data

Dec. 16, 2019 (EP) .................................... 19216574

(51) Int. Cl.
*G06T 15/20* (2011.01)
*G06T 7/194* (2017.01)
(Continued)

(52) U.S. Cl.
CPC ............ *G06T 15/205* (2013.01); *G06T 7/194* (2017.01); *G06T 7/70* (2017.01); *G06T 15/04* (2013.01);
(Continued)

(58) Field of Classification Search
CPC ......... G06T 15/205; G06T 7/194; G06T 7/70; G06T 15/04; G06T 15/08; G06T 15/60;
(Continued)

(56) References Cited

U.S. PATENT DOCUMENTS 10,970,843 B1 * 4/2021 Olsen .................. H04N 21/4316
11,513,658 B1 * 11/2022 Olsen .................... H04L 65/612
(Continued)

FOREIGN PATENT DOCUMENTS

WO 2019073117 4/2019

OTHER PUBLICATIONS

Shi, Shu, "A Survey of Interactive Remote Rendering Systems," ACM Computer Surveys, vol. 47, No. 4, Article 57 (May 2015).
(Continued)

*Primary Examiner* — Jin Cheng Wang
(74) *Attorney, Agent, or Firm* — PRICE HENEVELD LLP

(57) ABSTRACT

A method of augmenting a view of a real-world environment with a view of a volumetric video object on a user device is disclosed. The method includes determining a current pose information (CPI) indicating a current pose of the view of the real-world environment and a desired pose of the volumetric video object in the real-world environment. The method further includes sending the CPI to a remote server.
(Continued)

The method further includes receiving a rendered view of the volumetric video object that has been rendered in accordance with the CPI from the remote server. The method also includes augmenting the view of the real-world environment by at least mapping the rendered view of the volumetric video object onto a planar mapping surface arranged according to the desired position of the volumetric video object.

16 Claims, 2 Drawing Sheets

(51) Int. Cl.
| | | |
|---|---|---|
| | *G06T 7/70* | (2017.01) |
| | *G06T 15/04* | (2011.01) |
| | *G06T 15/08* | (2011.01) |
| | *G06T 15/60* | (2006.01) |
| | *G06T 19/00* | (2011.01) |

(52) U.S. Cl.
CPC .............. *G06T 15/08* (2013.01); *G06T 15/60* (2013.01); *G06T 19/006* (2013.01); *G06T 2207/20112* (2013.01); *G06T 2215/16* (2013.01)

(58) Field of Classification Search
CPC ......... G06T 19/006; G06T 2207/20112; G06T 2215/16; G06T 2210/08; G06T 7/10
See application file for complete search history.

(56) References Cited

U.S. PATENT DOCUMENTS

| | | | |
|---|---|---|---|
| 2012/0320169 A1* | 12/2012 | Bathiche | .............. G02B 27/017 |
| | | | 348/53 |
| 2015/0262402 A1* | 9/2015 | Heinz, II | ........... H04N 21/6582 |
| | | | 345/581 |
| 2018/0091791 A1 | 3/2018 | Jiang et al. | |
| 2019/0199993 A1* | 6/2019 | Babu J D | .............. G06F 3/011 |
| 2019/0230317 A1 | 7/2019 | Sheftel et al. | |
| 2020/0169715 A1* | 5/2020 | Liu | ...................... H04N 13/117 |
| 2022/0141548 A1* | 5/2022 | Niamut | .............. H04N 21/4312 |
| | | | 725/116 |

OTHER PUBLICATIONS

Schwarz, Sebastian et al., "Nokia's response to CfP for Point Cloud Compression (Category 2)," Nokia Technologies, Macau, CN (Oct. 2017).

Schreer, O., et al., "Advanced Volumetric Capture and Processing," Fraunhofer Heinrich Hertz Institute, Berlin, Germany (Sep. 2018).

Doumanoglou, Alexandros, et al., "Benchmarking Open-Source Static 3D Mesh Codecs for Immersive Media Interactive Live Streaming," Journal on Emerging and Selected Topics in Circuits and Systems (Mar. 2019).

Yuheng, Song, et al., "Image Segmentation Algorithms Overview," SiChuan University, SiChuan, ChengDu (undated).

Karthika, S., et al., "Hololens," International Journal of Computer Science and Mobile Computing, vol. 6, Issue 2 (Feb. 2017), pp. 41-50.

* cited by examiner

AUGMENTING A VIEW OF A REAL-WORLD ENVIRONMENT WITH A VIEW OF A VOLUMETRIC VIDEO OBJECT

CROSS-REFERENCE TO FOREIGN PRIORITY APPLICATION

The present application claims the benefit under 35 U.S.C. §§ 119 (b), 119 (e), 120, and/or 365 (c) of PCT/EP2020/086121 filed Dec. 15, 2020, which claims priority to European Application No. EP 19216574.4 filed Dec. 16, 2019.

FIELD OF THE INVENTION

The present invention relates to a method of augmenting a view of a real-world environment with a view of a volumetric video object on a user device as well as to the user device. The present invention further relates to a method of rendering a view of a volumetric video object for augmenting a view of a real-world environment on a remote server as well as to the remote server. The present invention further relates to a method and system for augmenting a view of a real-world environment with a view of a volumetric video object.

BACKGROUND OF THE INVENTION

1. AR frameworks (user device):

AR (augmented reality) frameworks such as Microsoft Hololens (see S. Karthika et al., "Hololens," International Journal of Computer Science and Mobile Computing (IJCSMC), Vol. 6, No. 2, pages 41 to 50, February 2017), Google ARCore (see developers.google.com/ar), Apple ARKit (see developer.apple.com/augmented-reality) are able to provide a user with a spatial awareness of a real-world environment. In the Hololens Spatial Awareness system, a representation of the geometry of the environment is provided (which may, e.g., be represented by a collection of meshes). This allows for a compelling interaction between the real-world and virtual objects.

2. Volumetric video objects:

The main idea of volumetric video is to capture a moving scene, such as moving persons, with multiple cameras from all directions and to reconstruct a dynamic three-dimensional (3D) model of the scene from the captured imagery. For example, the Volucap studio in Potsdam-Babelsberg, Germany, uses thirty-two cameras, arranged as stereo systems, around the scene (see O. Schreer et al., "Advanced volumetric capture and processing," Proceedings of International Broadcast Conference (IBC), Amsterdam, The Netherlands, September 2018). A fast but robust depth estimation scheme is applied to each stereo pair to generate depth information for each individual pixel with high accuracy. Thereafter, the depth information of all sixteen stereo pairs is merged by using data from an initial camera calibration and a related 3D fusion process. The result of this fusion process is a 3D point cloud that may be processed by different post-production steps. Such post-production of the 3D point cloud may include a step of meshing, in which the 3D point cloud is converted into a mesh, a step of simplifying the mesh by reducing the number of triangles in the mesh, a step of texturing the mesh with the texture(s) of the captured scene, and, possibly, a step of mesh tracking in order to establish topological coherence in a temporal mesh sequence.

3. Compression and distribution of volumetric video objects:

Before a volumetric video can be streamed over the network to a client, the corresponding meshes and textures need to be compressed to a reasonable size. To do so, the raw data of the volumetric video (i.e., the meshes and textures) may be encoded independently from each other. In one possible implementation, the textures are encoded with H.264/AVC due to its comparably lightweight decoding and wide support on mobile devices. An extension to H.265/HEVC that is particularly suited for the encoding of textures is also foreseen in the future. This is expected to lead to an additional data rate reduction for the compressed stream while keeping the same level of quality.

Furthermore, different compression methods may be applied for the mesh encoding process, such as Corto, Draco, Open3DGC, etc. (see also A. Doumanoglou et al., "Benchmarking open-source static 3D mesh codecs for immersive media interactive live streaming," IEEE Journal on Emerging and Selected Topics in Circuits and Systems, Vol. 9, No. 1, pages 190 to 203, 2019). Moreover, the audio signal may be encoded with a standard audio encoder. Finally, the three different elementary streams (mesh, texture map, audio) may be multiplexed into a single common MP4 file, which is ready for transmission over the network. On the receiver side, plugins for Unity (see unity.com) and/or Unreal (www.unrealengine.com) allow for easy integration of volumetric video assets into the target AR or VR application. These plugins include a de-multiplexer, as well as related decoders and perform real-time decoding of the mesh sequence.

4. Technical limitations for distributing a volumetric video object to an end device:

At present, there exist a number of technical limitations for distributing a volumetric video object to a user device. These include the hardware capabilities of the end device. For example, the decoding of volumetric video cannot be fully performed with the current hardware and it is expected to take at least a couple of more years before specialized hardware for volumetric video decoding is integrated into mobile devices. Moreover, the rendering capabilities on mobile hardware are currently limited compared to Desktop GPUs (graphics processing units). While it can be possible to render a single volumetric video object, the rendering of complex scenes with multiple objects is still very challenging. Also this problem is not expected to cease within the near future. Other limitations relate to the transmission bitrate. A single volumetric video object may consume tens of Mbit/s, which makes it very difficult to stream.

5. Solution for distribution to a user device:

In view of these problems, it has been proposed, e.g., by NVIDIA (CloudXR), UnityRenderStreaming and Unreal Pixel Streaming to render the volumetric video in the cloud based on user's position as measured by the AR headset and to then send the rendered texture as a two-dimensional (2D) video to the user device via the network (e.g., the AR headset) (see, for example, blogs.nvidia.com/blog/2019/10/22/nvidiacloudxr). This, of course, requires a low latency in the network.

6. Problem of integrating 2D video into a spatial 3D AR scene:

When the rendered view is finally delivered to the user's end device, it represents a simple 2D video, which needs to be integrated in the real-world 3D scene. Occlusions as well as collisions with real-world objects must be possible in order to ensure a high-quality viewing experience, though the 2D video itself does not contain information on its volumetric expansion.

It is, therefore, desirable to allow for an improved augmentation of a view of a real-world environment with a view of a volumetric video object on a user device.

SUMMARY OF THE INVENTION

It is an object of the present invention to provide an improved method of augmenting a view of a real-world environment with a view of a volumetric video object on a user device. It is a further object of the present invention to provide an improved method of rendering a view of a volumetric video object for augmenting a view of a real-world environment on a remote server. It is yet a further object of the present invention to provide a corresponding user device and remote server.

According to an aspect of the present invention, a method of augmenting a view of a real-world environment with a view of a volumetric video object on a user device is presented, comprising:
 determining a current pose information indicating a current pose of the view of the real-world environment and a desired pose of the volumetric video object in the real-world environment;
 sending the current pose information to a remote server;
 receiving a rendered view of the volumetric video object that has been rendered in accordance with the current pose information from the remote server; and
 augmenting the real-world environment by at least mapping the rendered view of the volumetric video object onto a planar mapping surface arranged according to the desired pose of the volumetric video object.

The term "volumetric video object," as used herein, refers to a dynamic 3D model of a scene, e.g., a moving person. It includes 3D models that have been generated by capturing the scene with multiple cameras from all directions and reconstructing the dynamic 3D model from the captured imagery. However, it also includes virtual objects, such as volumetric CGI objects and the like.

In embodiments of the method, the user device may be a mobile phone, such as a smartphone, a tablet, or a wearable device, such as a headset, helmet, goggles, or glasses (referred to herein as a head-mounted display (HMD)). The user device may comprise world-facing sensors that collect information about the real-world environment, e.g., video, depth or range information, lighting information, etc. The view of the real-world environment may be a 2D view, e.g., a monoscopic view in which a single view is provided to both eyes of the user on a monoscopic display of a regular smartphone, or it may be a 3D view, e.g., a stereoscopic view in which two different views are provided to the two eyes of the user on an (auto-) stereoscopic display of a 3D smartphone. If the user device is an HMD, the view of the real-world environment may also be a 3D view, e.g., a stereoscopic view, that is provided on at least one display of the HMD. Alternatively, the HMD may comprise an optical see-through visor or the like and the view of the real-world environment may be the direct, unmediated view of the world that the user perceives through the visor.

In some embodiments, the sensors may comprise one or more cameras (e.g., RGB (visible light) cameras) that capture high-quality views of the world that may be used to provide the user with the view of the real-world environment. In some embodiments, the sensors may comprise one or more sensors that capture depth or range information of the real-world environment (e.g., infrared (IR) cameras with an IR illumination source, or Light Detection and Ranging (LIDAR) emitters and receivers/detectors). In some embodiments, the sensors may comprise one or more cameras that capture lighting information (e.g., direction, color, intensity) of the real-world environment that may, for example, be used in rendering (e.g., coloring and/or lighting) content in the view of the real-world environment.

In some embodiments, the sensors may comprise one or more sensors that may capture information about the position, orientation, and/or movement of the user or user device in the real-world environment. In some embodiments, the sensors may comprise one or more sensors that track the movement of the user's eyes. This information may then be used in the determining of the current pose information indicating the current pose of the view of the real-world environment. For example, if the user device is an HMD comprising an optical see-through visor, the captured depth or range information may be used to represent the geometry of the real-world environment, e.g., as a collection of meshes, and the current pose of the view of the real-world environment may be determined from the current position, orientation, and eye movement of the user with respect to geometry of the real-world environment.

In some embodiments, the user device executes an AR framework, such as Microsoft HoloLens, Google ARCore, Apple ARKit, WebXR Device API, or the like.

Since the volumetric video object is a timed medium that may exhibit temporal changes (e.g., a person that moves or gestures), and since also the current pose of the view of the real-world environment and/or the desired pose of the volumetric video object may change over time, e.g., if the user moves within the real-world environment or if the user's eyes move, the method of augmenting a view of a real-world environment with a view of a volumetric video object may preferably be performed repeatedly on the user device and the remote server. In this respect, it may be preferable that the frequency with which the current pose information is determined on the user device and sent to the remote server, and the frequency with which the rendered view of the volumetric video object is rendered in accordance with the current pose information, are substantially matched to the time base of the volumetric video object. This may ensure that the augmented view of the real-world environment always shows the most recent "state" of the volumetric video object as seen according to the most recent pose information. Of course, it may also be possible that the current pose information is updated at a higher frequency and/or that the time base of the volumetric video object has a higher frequency than the rendering performed by the remote server.

It is preferred that the mapping surface is oriented such that the rendered view of the volumetric video object is projected into the view of the real-world environment substantially free of perspective distortion. This may be achieved, for example, by orienting the mapping surface to be substantially orthogonal to a viewing ray between a surface origin and the center of projection of the view of the real-world environment. The surface origin may be calculated, e.g., as the center of the bounding box of the virtual video object as shown in the rendered view of the virtual video object or as its center of mass. That way, the rendered view of the volumetric video object is substantially correctly projected into the view of the real-world environment. If the current pose of the view of the real-world environment and/or the desired pose of the volumetric video object changes, e.g., if the user moves within the real-world environment, the arrangement of the mapping surface is preferably adapted to reflect the change.

In some embodiments, the rendered view of the volumetric video object, which is received by the user device, is coded using a suitable picture or video coding technology. For example, it may be coded as an individual picture using, e.g., a picture coding standard, such as JPEG, or, preferably, it may be coded as a moving picture sequence comprising a sequence of rendered views of the volumetric video object using, e.g., a video coding standard, such as H.264/AVC (Advanced Video Coding) or H.265/HEVC (High Efficiency Video Coding).

In some embodiments, the transmission between the user device and the remote server makes use of a wireless communication technology, e.g., Wireless LAN. In some embodiments, the wireless communication technology is a mobile communication technology, e.g., a 5G mobile communication technology. In some embodiments, the remote server is located in the cloud, e.g., the remote server may be an edge server that is located at the edge of a 5G mobile communication network, e.g., at a base station of the network. This may reduce the latency between the user device and the remote server.

It is preferred that the rendered view of the volumetric video object comprises at least one background region that does not show the volumetric video object, wherein the augmenting comprises setting the at least one background region to be transparent. Since the volumetric video object may be arbitrarily shaped, whereas the rendering of the rendered view of the volumetric video object as well as any picture or video coding thereof may be performed on rectangular frames, typically not all regions of the rendered view of the volumetric video object will belong to the volumetric video object (foreground region). Since the view of the real-world environment shall preferably only be augmented with the view of the volumetric video object itself, the region(s) of the rendered view of the volumetric video object that does/do not show the volumetric video object (background region(s)) must therefore be set to be transparent.

It is further preferred that the rendered view of the volumetric video object comprises a transparency map that indicates the at least one background region or that the at least one background region is indicated in the rendered view of the volumetric video object by a predefined color, wherein the augmenting further comprises determining the at least one background region based on the transparency map or the predefined color. One approach for indicating the at least on background region to the user device is the use of an additional transparency map (sometimes also called "alpha map"), in which pixels belonging to the at least one background region are given a different value than pixels belonging to the foreground region (here, the volumetric video object as shown in the rendered view of the volumetric video object). The user device can then check for each pixel in the rendered view of the volumetric video object whether the value of the corresponding pixel in the transparency map indicates the at least one background or the foreground region. For example, pixels belonging to the at least one background region may be given the lowest possible value (e.g., 0), indicating full transparency, and pixels belonging to the foreground region may be given the highest possible value (e.g., 255 in an 8-bit transparency map), indicating full opaqueness. Advantageously, the transparency map may also allow for intermediate transparency/opaqueness values (e.g., a value of 128 may indicate that a pixel is 50% transparent/opaque. This may allow for a smooth blending between volumetric video object as shown in the rendered view of the volumetric video object and the view of the real-world environment. An alternative approach for indicating the at least one background region to the user device is to give the pixels in the rendered view of the volumetric video object belonging to the at least one background region a predefined color. Such color should preferably be a color that is unlikely to occur in the volumetric video object, for example, a highly saturated green or blue. The user device can then check for each pixel in the rendered view of the volumetric video object whether its color indicates the at least one background region. An advantage of this approach is that it does not require the overhead of an additional transparency map. On the other hand, a disadvantage of this approach is that it requires additional client-side processing for background subtraction.

Alternatively, it is preferred that the augmenting further comprises segmenting the volumetric video object as shown in the rendered view of the volumetric video object and determining the at least one background region based on the segmentation of the volumetric video object. This approach may use shape detection algorithms, based, e.g., on machine learning techniques, to segment the volumetric video object as shown in the rendered view of the volumetric video object (see, for example, S. Yuheng and Y. Hao, "Image Segmentation Algorithms Overview," ArXiv, 2017). Once the shape is known, the region(s) outside the shape may be classified as belonging to the at least one background region.

It is preferred that the size and/or shape of the mapping surface is dynamically set based on the size and/or shape of the volumetric video object as shown in the rendered view of the volumetric video object. For example, the shape of the mapping surface may be set to be rectangular with a size that corresponds to a bounding box of the volumetric video object as shown in the rendered view of the volumetric video object. Alternatively, the shape and/or size of the mapping surface may be set to even more closely resemble the size and/or shape of the volumetric video object. For example, if the rendered view of the volumetric video object is coded using a block-based picture or video coding technology, the shape of the mapping surface may be set to correspond to the shape formed by the blocks (e.g., macro blocks, coding tree blocks, or the like) that comprise information from the volumetric video object as shown in the rendered view of the volumetric video object. As another example, it may be an option to partition the rendered view of the volumetric video object in small squares or rectangles of a given size and to set the shape of the mapping surface to correspond to the shape formed by the squares or rectangles that comprise information from the volumetric video object as shown in the rendered view of the volumetric video object. Dynamically setting the size and/or shape of the mapping surface in this way can help to avoid collisions between the mapping surface and other objects (e.g., other volumetric video objects, virtual objects, etc.) or the real-world environment when the latter is augmented with the view of the volumetric video object.

It is preferred that the receiving further comprises receiving an approximate volume information indicating the approximate volume of the volumetric video object, wherein the augmenting further comprises using the approximate volume information for one or more of collision avoidance, correcting a lighting of the rendered view of the volumetric video object, generating at least one shadow of the volumetric video object in the real-world environment, and generating at least one reflection of the volumetric video object in the real-world environment. In order for the augmentation of the view of the real-world environment with the view of the volumetric video object to appear natural, it is preferable that collisions, lighting, shadows and/or reflections are handled correctly. This is helped greatly if the augmenting has at least approximate knowledge of the volume of the volumetric video object.

It is further preferred that the approximate volume information comprises first approximate volume information for visible parts of the volumetric video object as shown in the rendered view of the volumetric video object and/or second approximate volume information for non-visible parts of the volumetric video object as shown in the rendered view of the volumetric video object. While the non-visible parts of the volumetric video object as shown in the rendered view of the volumetric video object itself are not seen in the augmented view of the real-world environment, these parts can nonetheless interact with other objects (e.g., other volumetric video objects, virtual objects, etc.) or the real-world environment (e.g., collide, cast shadows, cast reflections, etc.). Thus, the best augmentation results may be achieved if approximate volume information is available for both the visible and non-visible parts of the volumetric video object as shown in the rendered view of the volumetric video object.

It is preferred that the first approximate volume information and/or the second approximate volume information comprises at least one of a depth map, mesh data, and one or more geometric primitives that approximate the volume of the volumetric video object. These different types of information are all well suited to approximate the volumes of typical volumetric video objects. Moreover, there exist very efficient coding technologies for coding this type of information, resulting in a comparably small overhead for transmitting the approximate volume information. For example, a depth map may be coded using H.265/HEVC and mesh data may be coded using mesh encoding processes such as Corto, Draco, Open3DGC, etc. It shall be noted here that there may typically be a trade-off between the accuracy of the volume approximation and, thus, the quality of the augmentation that can be achieved, and the amount of data that is required to transmit the approximate volume information.

In some embodiments, it may be desirable to augment the view of the real-world environment with views of more than one, e.g., two, three, or more, volumetric video objects. When the views of the volumetric video objects are rendered on the remote server, it is still preferable to send only a single picture or video texture to the user device. This makes it possible, e.g., to use only a single picture or video decoder (e.g., a hardware decoder) on the user device. Moreover, since the user device only receives a single stream, the streaming is simplified and all volumetric video objects are already synchronized with the received texture. Therefore, it is preferred that the rendered views of the volumetric video objects are packed into a single texture (e.g., in a side-by-side or other spatial packing format).

As described above for the view of a single volumetric video object, the rendering of the views of the volumetric video objects is performed on the remote server in accordance with the current pose information sent from the user device. In order to correctly handle occlusions and collision when augmenting the view of the real-world environment with the views of the volumetric video objects, it is preferred that each volumetric video objects is rendered separately in an individual view. This can be achieved, e.g., by defining multiple "virtual cameras" with identical position and orientation (in accordance with the current pose information), assigning each volumetric video object to a unique layer (e.g., Unity layer: docs.unity3d.com/Manual/Layers.html) and having each camera use a culling mask assigned to that specific layer. This guarantees that even when two or more volumetric video objects occlude each other when seen in accordance with the current pose information, they still can be processed separately from each other on the user device.

Since all "virtual cameras" have an identical position and orientation (in accordance with the current pose information), some volumetric video objects may be outside the rendered views. In some embodiments, a rendered view without any volumetric video object in it can be omitted from the packed texture, which causes the resolution of the encoded picture or video to change (pipeline re-initialization on the user device and on the remote server), allowing for a more efficient utilization of resources. In other embodiments, the resolution of the packed texture is fixed (based on the number of volumetric video objects and selected packing configuration) to enable more simplified implementations.

When the user device receives the packed texture, it has to unpack each individual view of a volumetric video object in order to accordingly augment the view of the real-world environment therewith. This may include at least mapping the rendered view of each volumetric video object onto a planar mapping surface arranged according to the desired pose of the respective volumetric video object.

To perform the unpacking of the packed texture (i.e., the extraction of the rendered views of the volumetric video objects), the user device needs to know how to unpack the packed texture into the different rendered views. Therefore, additional metadata comprising respective unpack information is preferably transmitted together with the packed texture. Such metadata may be as follows:

```
struct PackedFrame {
    uint32 texture_width;
    uint32 texture_height;
    uint32 object_count;
    for (int i=0; i<object_count; i++) {
        uint32 type
        uint32 object_id;
        uint32 x;
        uint32 y;
        uint32 width;
        uint32 height;
    }
}.
```

The metadata describes the size of the packed texture and defines a list of rendered views (one for each volumetric video object), where every entry of the list has a unique ID of the object, a top-left corner given as an x- and y-position in the packed texture as well as a width and height of the rendered view. The type value gives information on whether this object is a volumetric video object or a video stream without a volume (e.g., a shadow, a reflection or the like; see below). For volumetric video objects, additional information, such as the above-described approximate volume information, is transmitted and associated to the object ID. The metadata can be transmitted in any suitable form, for example, as a JSON, XML or as binary data.

It is further preferred that the determining further comprises determining a lighting information indicating a lighting of the real-world environment, wherein the sending further comprises sending the lighting information to the remote server, and wherein the rendered view of the volumetric video object has been rendered taking into account the lighting information. This may greatly help the augmenting in making the view of the virtual video object appear natural within the view of the real-world environment. For example, if the real-world environment is lighted with a very bright light, or with only a rather dim light, or with a strongly colored light, or with a highly directional light, the rendered view of the volumetric video object may appear very unnatural within the view of the real-environment if the rendering does not account for the lighting.

It is preferred that the determining further comprises determining a reflection information indicating at least one reflection of the volumetric video object in the real-world environment, wherein the sending further comprises sending the reflection information to the remote server, wherein the receiving further comprises receiving at least one rendered view of the at least one reflection that has been rendered taking into account the reflection information from the remote server, and wherein the augmenting further comprises generating the at least one reflection of the volumetric video object in the real-world environment based on the at least one rendered view of the at least one reflection. Like the rendered view of the volumetric video object, the at least one rendered view of the at least one reflection may be coded as individual pictures or as at least one moving picture sequence using a suitable picture or video coding technology (e.g., JPEG, H.264/AVC, or H.265/HEVC). In addition, metadata providing information for generating the at least one reflection may be transmitted from the remote server to the user device (e.g., bump map information, normal map information, displacement map information, etc.). In one approach, the augmenting may render the at least one reflection directly from the at least one rendered view of the at least one reflection. Alternatively, the augmenting may map them onto at least one planar mapping surface, as described above with respect to the rendered view of the volumetric video object.

It is preferred that the sending further comprises sending the view of the real-world environment to the remote server, wherein the rendered view of the volumetric video object has been rendered taking into account a lighting of the real-world environment, and/or wherein the receiving further comprises receiving at least one rendered view of at least one shadow of the volumetric video object in the real-world environment, and/or wherein the receiving further comprises receiving at least one rendered view of at least one reflection that has been rendered taking into account at least one reflection of the volumetric video object in the real-world environment, and/or wherein the augmenting comprises generating the at least one shadow of the volumetric video object in the real-world environment based on the at least one rendered view of the at least one shadow, and/or wherein the augmenting comprises generating the at least one reflection of the volumetric video object in the real-world environment based on the at least one rendered view of the at least one reflection, wherein the lighting and/or the at least one shadow and/or the at least one reflection has been determined based on the view of the real-world environment. Here, the determination of the appearance of the real-world environment (e.g., lighting, shadows, reflections) is performed on the remote server based on the view of the real-world environment as sent by the user device. The view of the real-world environment, the at least one rendered view of the at least one shadow, and/or the at least one rendered view of the at least one reflection may be coded as individual pictures or as at least one moving picture sequence using a suitable picture or video coding technology (e.g., JPEG, H.264/AVC, or H.265/ HEVC), as described above. The view of the real-world environment may be a low resolution version that is sufficient for determining the appearance information but at the same time can be transmitted with low overhead. The at least one rendered view of the at least one shadow and/or the at least one rendered view of the at least one reflection may be transmitted as separate videos/pictures or may be combined into a single texture that is transmitted together with metadata for extracting the separate videos/pictures on the user device, as described above. The former approach requires the use of parallel decoding on the user device, while the latter approach may allow using a hardware decoder on the user device. The augmenting may comprise a simple overlay of the at least one rendered view of the at least one shadow and/or of the at least one rendered view of the at least one reflection on the view of the real-world environment.

In view of the above, it is preferred that the rendered view of the volumetric video object is received in a packed texture in which it is packed together with a rendered view of a further volumetric video object and/or the at least one rendered view of the at least one shadow and/or the at least one rendered view of the at least one reflection.

It is further preferred that the receiving further comprises receiving metadata comprising unpack information indicating how to unpack the packed texture into the different rendered views.

It is preferred that the view of the real-world environment and the rendered view of the volumetric video object are stereoscopic views comprising two different views for the two eyes of the user, wherein the augmenting comprises at least mapping each of the two different views of the rendered view of the volumetric video object onto a planar mapping surface. This allows to augment a stereoscopic view of a real-world environment as it may be seen with an HMD (e.g., a headset, helmet, goggles, or glasses), a 3D smartphone, or the like. The stereoscopic rendering of the view of the volumetric video object on the remote server then has the advantage that effects such as lighting, shadows and reflections can be individually applied to each of the two different views, allowing for a very natural appearance.

Alternatively, it is preferred that the view of the real-world environment is a stereoscopic view comprising two different views for the two eyes of the user, wherein the receiving comprises receiving stereoscopic view generation information for rendering a stereoscopic view of the volumetric video object from the rendered view of the volumetric video object, and wherein the augmenting further comprises generating the stereoscopic view of the volumetric video object from the rendered view of the volumetric video object in accordance with the stereoscopic view generation information and mapping each of the two different views of the generated stereoscopic view of the volumetric video object onto a planar mapping surface. Again, this allows to augment a stereoscopic view of a real-world environment as it may be seen with an HMD (e.g., a headset, helmet, goggles, or glasses), a 3D smartphone, or the like. By providing, in addition to the rendered view of the volumetric video object, a stereoscopic view generation information to the user device, the generation of the stereoscopic view of the volumetric video object can be made more flexible. Moreover, the stereoscopic view generation information may be coded more efficiently than the additional view of a stereoscopic view. The stereoscopic view generation information may be the same as the above-described approximate volume information, or it may be information that is more specific to the generation of the stereoscopic view, e.g., a parallax map indicating for each foreground pixel of the rendered view of the volumetric video object an amount of parallax between the two different views.

According to another aspect of the present invention, a user device for augmenting a view of a real-world environment with a view of a volumetric video object is presented, comprising:
- a determining unit for determining a current pose information indicating a current pose of the view of the real-world environment and a desired pose of the volumetric video object in the real-world environment;
- a sending unit for sending the current pose information to a remote server;
- a receiving unit for receiving a rendered view of the volumetric video object that has been rendered in accordance with the current pose information from the remote server; and
- an augmenting unit for augmenting the real-world environment by at least mapping the rendered view of the volumetric video object onto a planar mapping surface arranged according to the desired position of the volumetric video object.

According to another aspect of the present invention, a method of rendering a view of a volumetric video object for augmenting a view of a real-world environment on a remote server is presented, comprising:
- receiving a current pose information indicating a current pose of the view of the real-world environment and a desired pose of the volumetric video object in the real-world environment from a user device;
- rendering a view of the volumetric video object in accordance with the current pose information; and
- sending the rendered view of the volumetric video object to the user device.

According to another aspect of the present invention, a remote server for rendering a view of a volumetric video object for augmenting a view of a real-world environment is presented, comprising:
- a receiving unit for receiving a current pose information indicating a current pose of the view of the real-world environment and a desired pose of the volumetric video object in the real-world environment from a user device;
- a rendering unit for rendering a view of the volumetric video object in accordance with the current pose information; and
- a sending unit for sending the rendered view of the volumetric video object to the user device.

According to another aspect of the present invention, a method for augmenting a view of a real-world environment with a view of a volumetric video object is presented, comprising:
- a method of augmenting a view of a real-world environment with a view of a volumetric video object on a user device, comprising:
  - determining a current pose information (CPI) indicating a current pose of the view of the real-world environment and a desired pose of the volumetric video object in the real-world environment;
  - sending the current pose information to a remote server;
  - receiving a rendered view of the volumetric video object that has been rendered in accordance with the current pose information from the remote server; and
  - augmenting the view of the real-world environment by at least mapping the rendered view of the volumetric video object onto a planar mapping surface arranged according to the desired position of the volumetric video object;
- A method of rendering a view of a volumetric video object for augmenting a view of a real-world environment on a remote server, comprising:
  - receiving a current pose information (CPI) indicating a current pose of the view of the real-world environment and a desired pose of the volumetric video object in the real-world environment from a user device;
  - rendering a view of the volumetric video object in accordance with the current pose information; and
  - sending the rendered view of the volumetric video object to the user device.

According to another aspect of the present invention, a system for augmenting a view of a real-world environment with a view of a volumetric video object is presented, comprising:
- a user device for augmenting a view of a real-world environment with a view of a volumetric video object, comprising:
  - a determining unit for determining a current pose information (CPI) indicating a current pose of the view of the real-world environment and a desired pose of the volumetric video object in the real-world environment;
  - a sending unit for sending the current pose information to a remote server;
  - a receiving unit for receiving a rendered view of the volumetric video object that has been rendered in accordance with the current pose information from the remote server (20); and
  - an augmenting unit for augmenting the real-world environment by at least mapping the rendered view of the volumetric video object onto a planar mapping surface arranged according to the desired position of the volumetric video object.
- A remote server for rendering a view of a volumetric video object for augmenting a view of a real-world environment, comprising:
  - a receiving unit for receiving a current pose information (CPI) indicating a current pose of the view of the real-world environment and a desired pose of the volumetric video object in the real-world environment from a user device;
  - a rendering unit for rendering a view of the volumetric video object in accordance with the current pose information; and
  - a sending unit for sending the rendered view of the volumetric video object to the user device.

It shall be understood that the methods, the user device, the remote server, and the system disclosed herein have similar and/or identical preferred embodiments, in particular, as defined in the claims.

It shall be understood that a preferred embodiment of the present invention can also be any combination of the dependent claims or above embodiments with the respective independent claim.

BRIEF DESCRIPTION OF THE DRAWINGS

These and other aspects of the present invention will be apparent from and elucidated with reference to the embodiments described hereinafter. In the following drawings.

DETAILED DESCRIPTION OF EMBODIMENTS

Other variations to the disclosed embodiments can be understood and effected by those skilled in the art in practicing the claimed invention, from a study of the drawings, the disclosure, and the appended claims.

Figure 1:
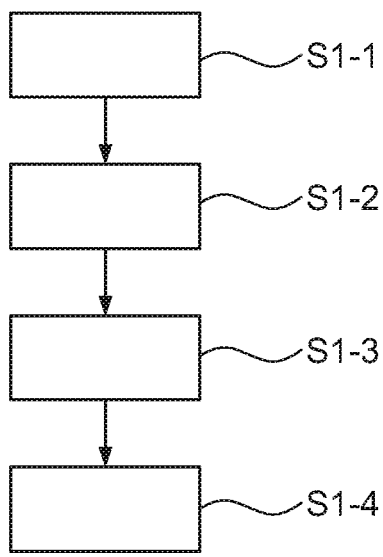
FIG. 1 shows a flowchart exemplarily illustrating a method of augmenting a view of a real-world environment with a view of a volumetric video object on a user device.

FIG. 1 shows a flowchart exemplarily illustrating a method of augmenting a view of a real-world environment with a view of a volumetric video object on a user device.

In step S1-1, a current pose information indicating a current pose of the view of the real-world environment and a desired pose of the volumetric video object in the real-world environment is determined.

In step S1-2, the current pose information is sent to a remote server.

In step S1-3, a rendered view of the volumetric video object that has been rendered in accordance with the current pose information is received from the remote server.

In step S1-4, the view of the real-world environment is augmented by at least mapping the rendered view of the volumetric video object onto a planar mapping surface arranged according to the desired position of the volumetric video object.

Figure 2:
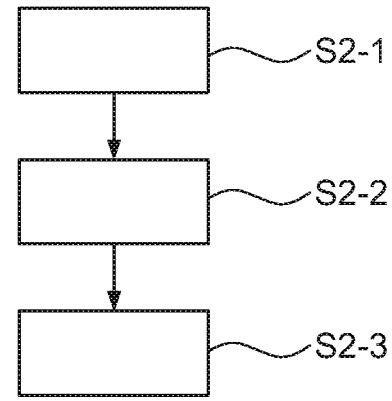
FIG. 2 shows a flowchart exemplarily illustrating a method of rendering a view of a volumetric video object for augmenting a view of a real-world environment on a remote server.

FIG. 2 shows a flowchart exemplarily illustrating a method of rendering a view of a volumetric video object for augmenting a view of a real-world environment on a remote server.

In step S2-1, a current pose information indicating a current pose of the view of the real-world environment and a desired pose of the volumetric video object in the real-world environment is received from a user device.

In step S2-2, a view of the volumetric video object is rendered in accordance with the current pose information.

In step S2-3, the rendered view of the volumetric video object is sent to the user device.

The methods of FIGS. 1 and 2 may be part of a method for augmenting a view of a real-world environment with a view of a volumetric video object, i.e., such method may comprise the method of FIG. 1 and the method of FIG. 2.

Figure 3:
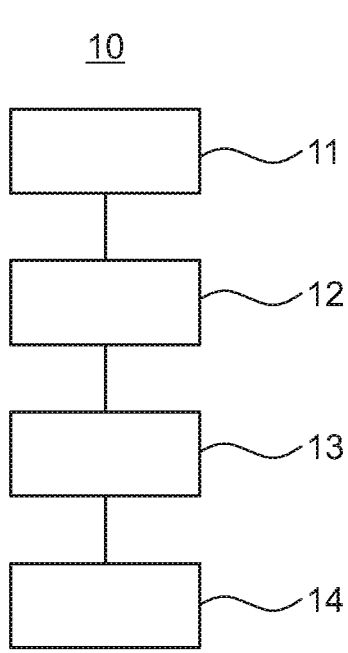
FIG. 3 shows schematically and exemplarily a system for augmenting a view of a real-world environment with a view of a volumetric video object.
Figure 3:
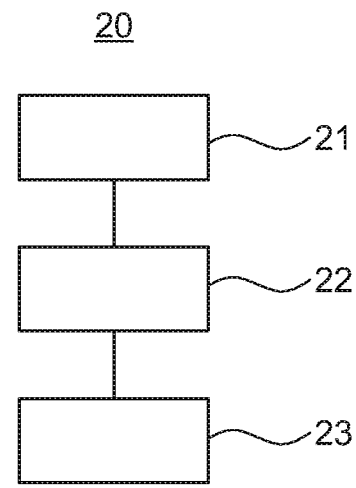

The method for augmenting a view of a real-world environment with a view of a volumetric video object may be implemented by a system 100 for augmenting a view of a real-world environment with a view of a volumetric video object as it is shown schematically and exemplarily in FIG. 3.

The system 100 comprises a user device 10 for augmenting a view of a real-world environment with a view of a volumetric video object and a remote server 20 for rendering a view of a volumetric video object for augmenting a view of a real-world environment.

The user device 10 comprises a determining unit 11 for determining a current pose information indicating a current pose of the view of the real-world environment and a desired pose of the volumetric video object in the real-world environment. The user device 10 further comprises a sending unit 12 for sending the current pose information to the remote server 20. Furthermore, the user device 10 comprises a receiving unit 13 for receiving a rendered view of the volumetric video object that has been rendered in accordance with the current pose information from the remote server 20. Yet further, the user device 10 comprises an augmenting unit 14 for augmenting the real-world environment by at least mapping the rendered view of the volumetric video object onto a planar mapping surface arranged according to the desired position of the volumetric video object.

The remote server 20 comprises a receiving unit 21 for receiving a current pose information indicating a current pose of the view of the real-world environment and a desired pose of the volumetric video object in the real-world environment from the user device 10. The remote server 20 further comprises a rendering unit 22 for rendering a view of the volumetric video object in accordance with the current pose information. Furthermore, the remote server 20 comprises a sending unit 23 for sending the rendered view of the volumetric video object to the user device 10.

Figure 4:
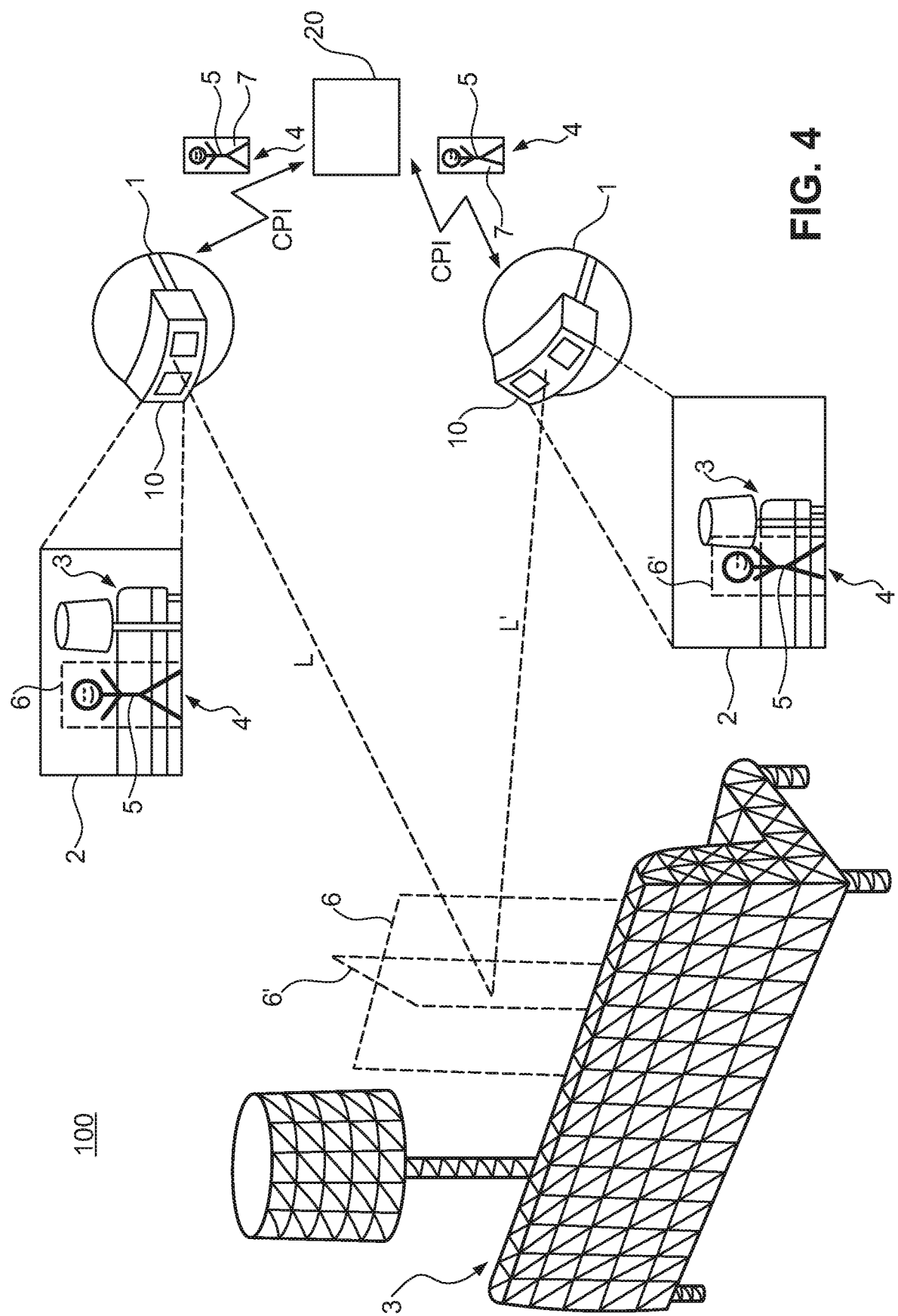
FIG. 4 shows schematically and exemplarily an embodiment of the system of FIG. 3, in which the user device is a head-mounted display (HMD) that is worn by a user and the remote server is an edge server that is located at the edge of a 5G mobile communication network that is used for the transmission between the HMD and the edge server.

In the following, we will explain the invention in more detail with reference to FIG. 4, which shows an embodiment of the system 100 of FIG. 3. In this embodiment, the user device 10 is a head-mounted display (HMD) that is worn by a user 1 (of which only the head is shown here) and the remote server 20 is an edge server that is located at the edge of a 5G mobile communication network that is used for the transmission (shown in the Figure by means of the arrows) between the HMD 10 and the edge server 20. This may reduce the latency between the HMD 10 and the edge server 20. The HMD 10 executes an AR framework, such as Microsoft HoloLens, Google ARCore, Apple ARKit, WebXR Device API, or the like.

The HMD 10, here, comprises an optical see-through visor (not explicitly shown in the Figure) through which the user 1 perceives a direct, unmediated view of the world. This provides the user 1 with a view 2 of the real-world environment 3. The HMD 10 further comprises world-facing sensors (also not explicitly shown in the Figure) that collect information about the real-world environment, e.g., video, depth or range information, lighting information, etc. The sensors comprise one or more sensors that capture depth or range information of the real-world environment 3 (e.g., infrared (IR) cameras with an IR illumination source, or Light Detection and Ranging (LIDAR) emitters and receivers/detectors). The sensors further comprise one or more sensors that track the movement of the user's eyes.

The captured depth or range information is used to represent the geometry of the real-world environment 3, e.g., as a collection of meshes (as shown in the Figure) and the determining unit 11 of the HMD 10 determines the current pose of the view 2 of the real-world environment 3 from the current position, orientation, and eye movement of the user 1 with respect to geometry of the real-world environment 3. The current pose of the view 2 of the real-world environment 3 and a desired pose of the volumetric video object 5 in the real-world environment 3 constitute the current pose information CPI that is determined by the determining unit 11 of the HMD 10.

The sending unit 1 of the HMD 10 sends the current pose information CPI to the edge server 20. The receiving unit 21 of the edge server 20 receives the current pose information CPI from the HMD 10 and the rendering unit 22 of the edge server 20 renders a view 4 of the volumetric video object 5 in accordance with the current pose information CPI. The sending unit 23 of the edge server 20 then sends the rendered view 4 of the volumetric video object 5 to the HMD 10, where it is received by the receiving unit 13 of the HMD 10.

Finally, the augmenting unit 14 of the HMD 10 augments the real-world environment 3 by at least mapping the rendered view 4 of the volumetric video object 5 onto a planar mapping surface 6, 6' arranged according to the desired position of the volumetric video object 5. This results in the augmented view 2 of the real-world environment 3.

As can be seen from FIG. 2, if the user 1 moves within the real-world environment 3 or if the user's eyes move, the current pose of the view 2 of the real-world environment 3 changes over time. For example, in the Figure the user 1 is shown in one case as perceiving the real-world environment 3 through the HMD 10 from a substantially frontal pose and in one case as perceiving the real-world environment 3 through the HMD 10 from a more lateral pose. In each case, the current pose information CPI that is determined by the HMD 10 and sent to the edge server 20 is different, resulting in a different rendered view 4 of the volumetric video object 5 being rendered by the edge server 20.

In this embodiment, the mapping surface 6, 6' is oriented such that the rendered view 4 of the volumetric video object 5 is projected into the view 2 of the real-world environment 3 substantially free of perspective distortion. This is achieved, here, by orienting the mapping surface 6, 6' to be substantially orthogonal to a viewing ray L, L' between a surface origin (not explicitly shown in the figure) and the center of projection of the view 2 of the real-world environment 3 resulting from the user 1 perceiving the real-world environment 3 through the HMD 10 (in one case that is shown here, from the substantially frontal pose, and in one case that is shown here, from a more lateral pose). That way, the rendered view 4 of the volumetric video object 5 is substantially correctly projected into the view 2 of the real-world environment 3. If the current pose of the view 2 of the real-world environment 3 and/or the desired pose of the volumetric video object 5 changes, e.g., if the user 1 moves within the real-world environment 3, the arrangement of the mapping surface 6, 6' is preferably adapted to reflect the change.

In this embodiment, the rendered view 4 of the volumetric video object 5 comprises at least one background region 7 that does not show the volumetric video object 5 and the augmenting unit 14 of the HMD 10 sets the at least one background region 7 to be transparent. This may be realized in a number of different ways. For example, the rendered view 4 of the volumetric video object 5 may comprise a transparency map (not shown in the Figure) that indicates the at least one background region 7 or the at least one background region 7 may be indicated in the rendered view 4 of the volumetric video object 5 by a predefined color. The augmenting unit 14 of the HMD 10 may then determine the at least one background region 7 based on the transparency map or the predefined color. Alternatively, the augmenting unit 14 of the HMD 10 may segment the volumetric video object 5 as shown in the rendered view 4 of the volumetric video object 5 and determine the at least one background region 7 based on the segmentation of the volumetric video object 5. This approach may use shape detection algorithms, based, e.g., on machine learning techniques, to segment the volumetric video object as shown in the rendered view of the volumetric video object (see, for example, S. Yuheng and Y. Hao, "Image Segmentation Algorithms Overview", ArXiv, 2017). Once the shape is known, the region(s) outside the shape may be classified as belonging to the at least one background region.

The rendered view 4 of the volumetric video object 5, which is sent by the edge server 20 and received by the HMD 10, is coded using a suitable picture or video coding technology. In this example, it is coded as a moving picture sequence comprising a sequence of rendered views 4 of the volumetric video object 5 using H.265/HEVC (High Efficiency Video Coding).

In some embodiments, the size and shape of the mapping surface 6, 6' may be dynamically set according to the size and shape of the volumetric video object 5 as shown in the rendered view 4 of the volumetric video object 5. For example, the shape of the mapping surface 6, 6' may be set to be rectangular with a size that corresponds to a bounding box of the volumetric video object 5 as shown in the rendered view 4 of the volumetric video object 5. Dynamically setting the size and/or shape of the mapping surface 6, 6' in this way can help to avoid collisions between the mapping surface 6, 6' and other objects (e.g., other volumetric video objects, virtual objects, etc.) or the real-world environment 3 when the latter is augmented with the view 4 of the volumetric video object 5.

In this embodiment, the sending unit 23 of the edge server 20 further sends an approximate volume information (not shown in the Figure) indicating the approximate volume of the volumetric video object 5 to the HMD 10. The receiving unit 13 of the HMD 10 receives the approximate volume information and the augmenting unit 14 of the HMD 10 further uses the approximate volume information for one or more of collision avoidance, correcting a lighting of the rendered view 4 of the volumetric video object 5, generating at least one shadow of the volumetric video object 5 in the real-world environment 3, and generating at least one reflection of the volumetric video object 5 in the real-world environment 3. In order for the augmentation of the view 2 of the real-world environment 3 with the view 4 of the volumetric video object 5 to appear natural, it is preferable that collisions, lighting, shadows, and/or reflections are handled correctly. This is helped greatly if the augmenting has at least approximate knowledge of the volume of the volumetric video object 5.

Here, the approximate volume information comprises first approximate volume information for visible parts of the volumetric video object 5 as shown in the rendered view 4 of the volumetric video object 5 and second approximate volume information for non-visible parts of the volumetric video object 5 as shown in the rendered view 4 of the volumetric video object 5. While the non-visible parts of the volumetric video object 5 as shown in the rendered view 4 of the volumetric video object 5 itself are not seen in the augmented view 2 of the real-world environment 5, these parts can nonetheless interact with other objects (e.g., other volumetric video objects, virtual objects, etc.) or the real-world environment 5 (e.g., collide, cast shadows, cast reflections, etc.). Thus, the best augmentation results may be achieved if approximate volume information is available for both the visible and non-visible parts of the volumetric video 5 object as shown in the rendered view 4 of the volumetric video object 5.

In this embodiment, the first approximate volume information and the second approximate volume information comprises a depth map. This type of information is well suited to approximate the volumes of typical volumetric video objects, e.g., the volumetric video object 5. Moreover, there exist very efficient coding technologies for coding this type of information, resulting in a comparably small overhead for transmitting the approximate volume information. For example, the depth map may be coded using H.265/HEVC.

The determining unit 11 of the HMD 10, here, further determines a lighting information (not shown in the Figure)

indicating a lighting of the real-world environment 3, and the sending unit 12 of the HMD 10 further sends the lighting information to the edge server 20. The receiving unit 21 of the edge server 20 receives the lighting information, and the rendering unit 22 of the edge server 20 renders the view 4 of the volumetric video object 5 taking into account the lighting information. This may greatly help the augmenting unit 14 of the HMD 10 in making the view 4 of the virtual video object 5 appear natural within the view 2 of the real-world environment 3. For example, if the real-world environment 3 is lighted with a very bright light, or with only a rather dim light, or with a strongly colored light, or with a highly directional light, the rendered view 4 of the volumetric video object 5 may appear very unnatural within the view 2 of the real-environment 3 if the rendering does not account for the lighting.

In this embodiment, the determining unit 11 of the HMD 10 further determines a reflection information (not shown in the Figure) indicating at least one reflection of the volumetric video object 5 in the real-world environment 3, and the sending unit 12 of the HMD 10 further sends the reflection information to the edge server 20. The receiving unit 21 of the edge server 20 receives the reflection information, the rendering unit 22 of the edge server 20 renders at least one view (also not shown in the figure) of the at least one reflection taking into account the reflection information, and the sending unit 23 of the edge server 20 sends the at least one rendered view of the at least one reflection to the HMD 10. The receiving unit 13 of the HMD 10 further receives the at least one rendered view of the at least one reflection from the edge server 20, and the augmenting unit 14 of the HMD 10 further generates the at least one reflection of the volumetric video object 5 in the real-world environment 3 based on the at least one rendered view of the at least one reflection.

Like the rendered view 4 of the volumetric video object 5, the at least one rendered view of the at least one reflection is coded, here, as at least one moving picture sequence using H.265/HEVC. In addition, metadata providing information for generating the at least one reflection is transmitted from the edge server 20 to the HMD 10 (e.g., bump map information, normal map information, displacement map information, etc.). The augmenting unit 14 of the HMD 10 then renders the at least one reflection directly from the at least one rendered view of the at least one reflection. Alternatively, the augmenting unit 14 may map them onto at least one planar mapping surface, as described above with respect to the rendered view 4 of the volumetric video object 5.

In this embodiment, the view 2 of the real-world environment 3 and the rendered view 4 of the volumetric video object 5 are stereoscopic views comprising two different views for the two eyes of the user 1 (not shown in the Figure), and the augmenting unit 14 of the HMD 10 at least maps each of the two different views of the rendered view 4 of the volumetric video object 5 onto a planar mapping surface (not explicitly shown in the Figure). This allows to augment a stereoscopic view of a real-world environment 3 as it is seen with the HMD 10. The stereoscopic rendering of the view 4 of the volumetric video object 5 on the edge server 20 then has the advantage that effects such as lighting, shadows, and reflections can be individually applied to each of the two different views, allowing for a very natural appearance.

In alternative embodiment, the view of the real-world environment is a stereoscopic view comprising two different views for the two eyes of the user, the receiving unit 13 of the HMD 10 receives stereoscopic view generation information (not shown in the Figure) for rendering a stereoscopic view of the volumetric video object 5 from the rendered view 4 of the volumetric video object 5, and the augmenting unit 14 of the HMD 10 generates the stereoscopic view of the volumetric video object 5 from the rendered view 4 of the volumetric video object 5 in accordance with the stereoscopic view generation information and maps each of the two different views of the generated stereoscopic view of the volumetric video object 5 onto a planar mapping surface. Again, this allows to augment a stereoscopic view of a real-world environment 3 as it is seen with the HMD 10. By providing, in addition to the rendered view 4 of the volumetric video object 5, a stereoscopic view generation information to the HDM 10, the generation of the stereoscopic view of the volumetric video object 5 can be made more flexible. Moreover, the stereoscopic view generation information may be coded more efficiently than the additional view of a stereoscopic view. The stereoscopic view generation information may be the same as the above-described approximate volume information, or it may be information that is more specific to the generation of the stereoscopic view, e.g., a parallax map indicating for each foreground pixel of the rendered view 4 of the volumetric video object 5 an amount of parallax between the two different views.

In other embodiments, the sending unit 11 of the HMD 10 further sends the view 2 of the real-world environment 3 to the edge server 20 and the receiving unit 21 of the edge server 20 receives the view 2 of the real-world environment 3 from the HMD 10. In some embodiments, the rendering unit 22 of the edge server 20 renders the view 4 of the volumetric video object 5 taking into account a lighting of the real-world environment 3. In some embodiments, the rendering unit 22 of the edge server 20 renders at least one view of at least one shadow of the volumetric video object 5 in the real-world environment 3, and the sending unit 23 of the edge server 20 sends the at least one rendered view of at least one shadow to the HMD 10, where it is received by the receiving unit 13 of the HMD 10. In some embodiments, the rendering unit 22 of the edge server 20 renders at least one rendered view of at least one reflection taking into account at least one reflection of the volumetric video object 5 in the real-world environment 3, and the sending unit 23 of the edge server 20 sends the at least one rendered view of the at least one reflection to the HMD 10, where it is received by the receiving unit 13 of the HMD 10. In some embodiments, the augmenting unit 14 of the HMD 10 generated the at least one shadow of the volumetric video object 5 in the real-world environment 3 based on the at least one rendered view of the at least one shadow. In some embodiments, the augmenting unit 14 of the HMD 10 generates the at least one reflection of the volumetric video object 5 in the real-world environment 3 based on the at least one rendered view of the at least one reflection. In some embodiments, the lighting and/or the at least one shadow and/or the at least one reflection is determined by the edge server 20 based on the view 2 of the real-world environment 3. The view of the real-world environment, the at least one rendered view of the at least one shadow, and/or the at least one rendered view of the at least one reflection may be coded, e.g., as moving picture sequences using H.265/HEVC. The view of the real-world environment may be a low resolution version that is sufficient for determining the appearance information but at the same time can be transmitted with low overhead. The at least one rendered view of the at least one shadow and/or the at least one rendered view of the at least one reflection may be transmitted as separate videos/pictures or may be combined into a single texture that is transmitted together with metadata for extracting the separate videos/pictures on the user device, as described above. The former approach requires the use of parallel decoding on the user device, while the latter approach may allow using a hardware decoder on the user device. The augmenting may comprise a simple overlay of the at least one rendered view of the at least one shadow and/or of the at least one rendered view of the at least one reflection on the view 2 of the real-world environment 3.

While in the above-described embodiments, the user device 10 is an HMD and the remote server 20 is an edge server, this does not have to be the case in other embodiments. For example, in some embodiments, the user device 10 can be a mobile phone, such as a smartphone, a tablet, or the like, and the remote server 20 may not be located at the edge of a 5G mobile communication network, but may be located further away from the user device 10. Moreover, in some embodiments, the view 2 of the real-world environment 3 and the rendered view 4 of the volumetric video object 5 may not be stereoscopic views comprising two different views for the two eyes of the user 1, but rather may be monoscopic views in which a single view is provided to both eyes of the user 1.

Other variations to the disclosed embodiments can be understood and effected by those skilled in the art in practicing the claimed invention, from a study of the drawings, the disclosure, and the appended claims.

In the claims, the word "comprising" does not exclude other elements or steps, and the indefinite article "a" or "an" does not exclude a plurality.

A single unit or device may fulfill the functions of several items recited in the claims. For example, the sending unit 12 and the receiving unit 13 of the user device 10 or the receiving unit 21 and the sending unit 23 of the remote server may each be a single sending/receiving unit. The mere fact that certain measures are recited in mutually different dependent claims does not indicate that a combination of these measures cannot be used to advantage.

Any reference signs in the claims should not be construed as limiting the scope.

The invention claimed is:

1. A method of augmenting a view of a real-world environment with a view of a volumetric video object on a user device, the method comprising the steps of:
    determining a current pose information (CPI) indicating a current pose of the view of the real-world environment and a desired pose of the volumetric video object in the real-world environment;
    sending the current pose information to a remote server;
    receiving a rendered view of the volumetric video object that has been rendered in accordance with the current pose information from the remote server; and
    augmenting the view of the real-world environment by at least mapping the rendered view of the volumetric video object onto a planar mapping surface arranged according to the desired position of the volumetric video object;
    wherein the planar mapping surface is oriented such that the rendered view of the volumetric video object is projected into the view of the real-world environment substantially free of perspective distortion.

2. The method as defined in claim 1, wherein the rendered view of the volumetric video object comprises at least one background region that does not show the volumetric video object, and wherein the augmenting step comprises setting the at least one background region to be transparent.

3. The method as defined in claim 2, wherein the rendered view of the volumetric video object comprises a transparency map that indicates the at least one background region is indicated in the rendered view of the volumetric video object by a predefined color, and wherein the augmenting step further comprises determining the at least one background region based on the transparency map or the predefined color.

4. The method as defined in claim 2, wherein the augmenting step further comprises segmenting the volumetric video object as shown in the rendered view of the volumetric video object and determining the at least one background region based on the segmentation of the volumetric video object.

5. The method as defined in claim 1, wherein the size and/or shape of the planar mapping surface is dynamically set based on the size and/or shape of the volumetric video object as shown in the rendered view of the volumetric video object.

6. The method as defined in claim 1, wherein the receiving step further comprises receiving an approximate volume information indicating the approximate volume of the volumetric video object, and wherein the augmenting step further comprises using the approximate volume information for one or more of collision avoidance, correcting a lighting of the rendered view of the volumetric video object, generating at least one shadow of the volumetric video object in the real-world environment, and generating at least one reflection of the volumetric video object in the real-world environment.

7. The method as defined in claim 6, wherein the approximate volume information comprises first approximate volume information for visible parts of the volumetric video object as shown in the rendered view of the volumetric video object and/or second approximate volume information for non-visible parts of the volumetric video object as shown in the rendered view of the volumetric video object.

8. The method as defined in claim 7, wherein the first approximate volume information and/or the second approximate volume information comprises at least one of a depth map, mesh data, and one or more geometric primitives that approximate the volume of the volumetric video object.

9. The method as defined in claim 6, wherein the determining step further comprises determining a reflection information indicating at least one reflection of the volumetric video object in the real-world environment, wherein the sending step further comprises sending the reflection information to the remote server, wherein the receiving step further comprises receiving at least one rendered view of the at least one reflection that has been rendered taking into account the reflection information from the remote server, and wherein the augmenting step further comprises generating the at least one reflection of the volumetric video object in the real-world environment based on the at least one rendered view of the at least one reflection.

10. The method as defined in claim 1, wherein the determining step further comprises determining a lighting information indicating a lighting of the real-world environment, wherein the sending step further comprises sending the lighting information to the remote server, and wherein the rendered view of the volumetric video object has been rendered taking into account the lighting information.

11. The method as defined in claim 1, wherein the sending step further comprises sending the view of the real-world environment to the remote server, wherein the rendered view of the volumetric video object has been rendered taking into account a lighting of the real-world environment, and/or wherein the receiving step further comprises receiving at least one rendered view of at least one shadow of the volumetric video object in the real-world environment, and/or wherein the receiving step further comprises receiving at least one rendered view of at least one reflection that has been rendered taking into account at least one reflection of the volumetric video object in the real-world environment, and/or wherein the augmenting step comprises generating the at least one shadow of the volumetric video object in the real-world environment based on the at least one rendered view of the at least one shadow, and/or wherein the augmenting step comprises generating the at least one reflection of the volumetric video object in the real-world environment based on the at least one rendered view of the at least one reflection, wherein the lighting and/or the at least one shadow and/or the at least one reflection has been determined based on the view of the real-world environment.

12. The method as defined in claim 11, wherein the rendered view of the volumetric video object is received in a packed texture in which it is packed together with a rendered view of a further volumetric video object and/or the at least one rendered view of the at least one shadow and/or the at least one rendered view of the at least one reflection.

13. The method as defined in claim 12, wherein the receiving further comprises receiving metadata comprising unpack information indicating how to unpack the packed texture into the different rendered views.

14. The method as defined in claim 1, wherein the view of the real-world environment and the rendered view of the volumetric video object are stereoscopic views comprising two different views for the two eyes of a user, and wherein the augmenting step comprises at least mapping each of the two different views of the rendered view of the volumetric video object onto a planar mapping surface.

15. The method as defined in claim 1, wherein the view of the real-world environment is a stereoscopic view comprising two different views for the two eyes of a user, wherein the receiving step comprises receiving stereoscopic view generation information for rendering a stereoscopic view of the volumetric video object from the rendered view of the volumetric video object, and wherein the augmenting step further comprises generating the stereoscopic view of the volumetric video object from the rendered view of the volumetric video object in accordance with the stereoscopic view generation information and mapping each of the two different views of the generated stereoscopic view of the volumetric video object onto a planar mapping surface.

16. A user device for augmenting a view of a real-world environment with a view of a volumetric video object, comprising:
a determining unit for determining a current pose information (CPI) indicating a current pose of the view of the real-world environment and a desired pose of the volumetric video object in the real-world environment;
a sending unit for sending the CPI to a remote server;
a receiving unit for receiving a rendered view of the volumetric video object that has been rendered in accordance with the CPI from the remote server; and
an augmenting unit for augmenting the real-world environment by at least mapping the rendered view of the volumetric video object onto a planar mapping surface arranged according to the desired position of the volumetric video object;
wherein the planar mapping surface is oriented such the at the rendered view of the volumetric video object is projected into the view of the real-world environment substantially free of perspective distortion.

* * * * *